(12) United States Patent
Khare et al.

(10) Patent No.: US 8,313,117 B2
(45) Date of Patent: Nov. 20, 2012

(54) PARENT STEERABLE TRICYCLE WITH INTERNAL STEERING LIMITER

(75) Inventors: Samir Khare, Los Angeles, CA (US); Yuval Caspi, Granada Hills, CA (US)

(73) Assignee: MGA Entertainment, Inc., Van Nuys, CA (US)

( * ) Notice: Subject to any disclaimer, the term of this patent is extended or adjusted under 35 U.S.C. 154(b) by 61 days.

(21) Appl. No.: 13/106,258

(22) Filed: May 12, 2011

(65) Prior Publication Data

US 2011/0278815 A1 Nov. 17, 2011

Related U.S. Application Data

(60) Provisional application No. 61/345,001, filed on May 14, 2010.

(51) Int. Cl.
*B62K 5/06* (2006.01)
(52) U.S. Cl. ........ 280/270; 280/272; 280/282; 280/292; 280/293; 280/263; 280/288.4
(58) Field of Classification Search .................. 280/270, 280/272, 282, 292, 293, 263, 288.4
See application file for complete search history.

(56) References Cited

U.S. PATENT DOCUMENTS

| | | | |
|---|---|---|---|
| 94,056 A * | 8/1869 | Allen | 280/267 |
| 3,485,507 A | 12/1969 | Christof | |
| 4,887,827 A | 12/1989 | Heggie | |
| D332,591 S | 1/1993 | Reely | |
| 5,924,713 A | 7/1999 | Li | |
| 6,003,890 A | 12/1999 | Inouye | |
| 6,082,754 A | 7/2000 | Jeunet et al. | |
| 6,120,048 A | 9/2000 | Li | |
| 6,378,884 B1 | 4/2002 | Kettler | |
| 6,612,598 B2 | 9/2003 | Wu | |
| 6,666,470 B2 | 12/2003 | Li | |
| 6,799,772 B2 * | 10/2004 | Kettler et al. | 280/279 |
| 6,811,172 B2 | 11/2004 | Yen | |
| 6,811,173 B1 | 11/2004 | Shih | |
| 6,840,527 B1 | 1/2005 | Michelau et al. | |
| 7,487,988 B2 * | 2/2009 | Kettler et al. | 280/279 |
| 2004/0041364 A1 * | 3/2004 | Yen | 280/263 |

OTHER PUBLICATIONS

Radio Flyer Steer & Stroll Trike, believed to have been on sale by Jun. 24, 2007.
Kettler Happy Navigator Tricycle, believed to have been on sale by Jan. 8, 2008.

* cited by examiner

*Primary Examiner* — Tashiana Adams
*Assistant Examiner* — Marlon Arce
(74) *Attorney, Agent, or Firm* — Intellectual Property Law Offices of Joel Voelzke, APC (57) ABSTRACT

A child's riding vehicle such as a tricycle has a secondary steering column through which the parent walking behind the tricycle may steer the tricycle. The secondary steering column is coupled to the first steering column by a pair of rods that are attached at their respective ends to a first flange around the primary steering column and a second flange around the secondary steering column. The steering rods also act as steering limiters by contacting the wheel fork tube at a predetermined maximum steering angle and resisting further rotation of the flange. The mechanism lies entirely within the hollow frame of the tricycle for safety. The child's steering handle can be disengaged from the fork tube to allow the parent to completely control the steering without interference from the child.

23 Claims, 7 Drawing Sheets

PARENT STEERABLE TRICYCLE WITH INTERNAL STEERING LIMITER

CROSS-REFERENCE TO RELATED APPLICATIONS

This application claims benefit of U.S. Provisional Patent Application Ser. No. 61/345,001 filed May 14, 2010.

BACKGROUND OF THE INVENTION

1. Field of the Invention

This invention relates to the field of riding vehicles. More particularly, this invention relates to the field of a riding vehicle such as a child's tricycle, having a separate steering mechanism by which the child's parent can steer the vehicle, and further having a steering limiting mechanism to prevent the front wheel(s) from being turned too far to the left or to the right, and further having a disengaging mechanism whereby the child's handlebar is disengaged from steering the front wheel.

2. Description of Related Art

Children's tricycles having provisions for locking the front wheel in a particular steering position are known. U.S. Pat. No. 6,082,754 issued to Jeunet et al. discloses a tricycle in which the front wheel can be locked in a forward-steering direction. Tricycles are also known that have not only a steering wheel lock, but also an additional handlebar so that a parent can push the tricycle and steer it like a stroller, with or without the front wheel locked in the forward-steering direction.

Additionally, steering limiters for vehicles such as bicycles and tricycles are known. U.S. Pat. No. 4,887,827 issued to Heggie, and U.S. Pat. No. 6,003,890 issued to Inouye, disclose steering limiters that prevent overrotation of the steering fork. Such overrotation could cause the front wheel to jackknife as discussed by Heggie, or can cause the fork to hit the vehicle frame as discussed by Inouye. When a child's vehicle is provided with a steering limiter, for safety reasons it is important that the steering limiter mechanism not include any parts that can pinch a child's finger or other body parts.

SUMMARY OF THE INVENTION

The present invention is of a vehicle such as a child's tricycle that is particularly well suited for use by a small child and an accompanying person such as the child's parent. For purposes of this discussion, the vehicle will be referred to as a tricycle, it being understood that the invention can be applied to, and used in, other types of vehicles as well including vehicles having different numbers of wheels. The tricycle can be actively steered by a parent following behind the tricycle using a removable parent's steering handlebar and steering column, with the parent's steering column being linked to the tricycle steering column so that the parent can steer the tricycle. Using this feature, the parent can push and steer, or simply steer, the tricycle from behind using the parent's handlebar, changing the direction of the tricycle as desired.

In an exemplary embodiment, the tricycle has a steering limiter to limit the steering to, for example, ±20° from the straight ahead position. The steering limiter is constructed as an integral part of the parent steering linkage so that the steering limiter does not require any additional parts. Still further, the steering limiter and the parent steering linkage are constructed so that they reside within the hollow frame of the tricycle making it virtually impossible for a child riding the tricycle, or the adult who is accompanying the child rider, to get his fingers caught and pinched in the steering limiter mechanism.

In an exemplary embodiment, the steering limiter is implemented as part of the parent steering connection linkage, and resides completely internal to the vehicle frame. In this embodiment the parent steering column is mechanically linked to the fork tube by two generally horizontal rigid steel steering rods, the steering rods mechanically linking flanges fixed to both the tricycle's primary steering column and the parent steering column such that the parent steering column and the parent steering column rotate together. When the steering is turned far enough to the left, the steering rod on the right side contacts the fork tube and, because it is held securely at its rear end, exerts a counter-rotational force on the flange attached to the tricycle steering column, thus preventing any further rotation thereof. Similarly, when the steering is turned far enough to the right, the steering rod on the left side contacts the fork tube and, because it is held securely at its rear end, exerts a counter-rotational force on the flange attached to the fork tube, thus preventing any further rotation thereof. In this way, the fork tube and hence the tricycle's steering are limited in their maximum rotations both to the left and to the right.

The vehicle also has a child's steering disengaging mechanism whereby the child's handlebar or other steering handle may be selectively engaged and disengaged from the front wheel. When the child's handlebar is disengaged, the child's handlebar turns to the left or to the right independent of any turning of the front wheel. In this way, the parent can quickly and easily disengage the child's handlebar which allows the parent to do the actual steering from behind, while the child plays at steering without actually affecting the steering. The parent therefore does not have to fight the child's actions in order to steer the vehicle.

In one aspect therefore, the invention is of a child's vehicle having a hollow frame including a fork support tube, a fork including a fork tube which extends into the fork support tube, a rider platform that supports the rider such as a child's seat mounted to the frame, a set of handlebars in front of the rider platform and defining the primary steering handle and connected to a primary steering column, a secondary steering column that acts as a parent steering column located behind the rider platform and extending into the frame, a first flange attached to the fork tube and located within the frame, a second flange attached to the parent's steering column and located within the frame, a pair of steel rods that define left- and right-side steering coupling rods connecting the two flanges together so that as one flange rotates the other flange also rotates with the result being that the parent can steer the vehicle via the parent's steering handle located at a suitable height on the parent's steering column, preferably at a height that is above the height of the child's steering handle, for the parent to walk behind the vehicle while holding the handle. When the fork is turned sufficiently far to the left, the right side steering coupling rod contacts the fork tube which exerts a counterforce on the steering coupling rod that tends to push the flange in the direction opposite from the turn, preventing any further rotation of the fork tube and hence any further steering rotation of the front wheel to the left. Similarly, when the fork is turned sufficiently far to the right, the left side steering coupling rod contacts the fork tube which exerts a counterforce on the steering coupling rod that tends to push the flange in the direction opposite from the turn, preventing any further rotation of the fork tube and hence any further steering rotation of the front wheel to the right. The fork tube therefore acts as a stop member that limits rotation of the steering. In this way, the steering coupling rods form part of both the steering coupler that transmits steering from the parent steering column to the fork tube, and also form part of a steering limiter. The steering limiter preferably limits steering to less than ±60°, and more preferably to less than about ±25°. In the exemplary embodiment, the steering is limited to a predefined maximum steering angle of about ±20°. The child's steering engaging and disengaging mechanism includes a rotatable knob that is rotatably mounted in the fork support tube area. The knob is rotatably attached to the child's steering column and includes a key that rotates with the knob. The child's steering column extends into the fork tube. The fork tube has an aperture through which the key extends. When the knob is rotated to the locked position, the key is oriented horizontally and substantially fills the aperture in the horizontal direction such that rotation of the child's steering column immediately translates to rotation of the fork tube. When the knob is rotated to the unlocked position, the key is oriented vertically leaving a substantial gap between the sides of the key and the sides of the aperture, thus creating substantial play between the key and the aperture. In this position, the child's steering column is substantially disengaged from the fork tube and the child's steering handle such as a set of handlebars rotates freely through a significant arc without exerting any rotational force on the fork tube. The child can turn his steering handle freely and thus play at steering without affecting the steering of the tricycle while the parent does the actual steering.

As either an optional additional steering limiter mechanism, or in an alternative embodiment, the steering limiter takes the form of a flange that is connected to the fork tube within the frame, projecting from the fork tube into the generally horizontally extending frame tube. When the steering is rotated far enough in one direction, the projecting portion of the flange hits against one of the side walls of the fork tube. The projecting portion of the flange therefore acts as a stop surface, and the side wall of the frame tube therefore acts as the corresponding stop member.

Because the mechanism that couples rotation of the parent steering column to rotation of the fork tube and that also acts as a steering limiter is located entirely within the hollow tricycle frame, it is virtually impossible for a child or an adult accompanying the child to get his or her fingers or other body parts pinched between parts of the mechanism. The mechanism is therefore very safe for use in a child's tricycle or other vehicle.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

DETAILED DESCRIPTION OF THE PREFERRED EMBODIMENTS

Figure 1:
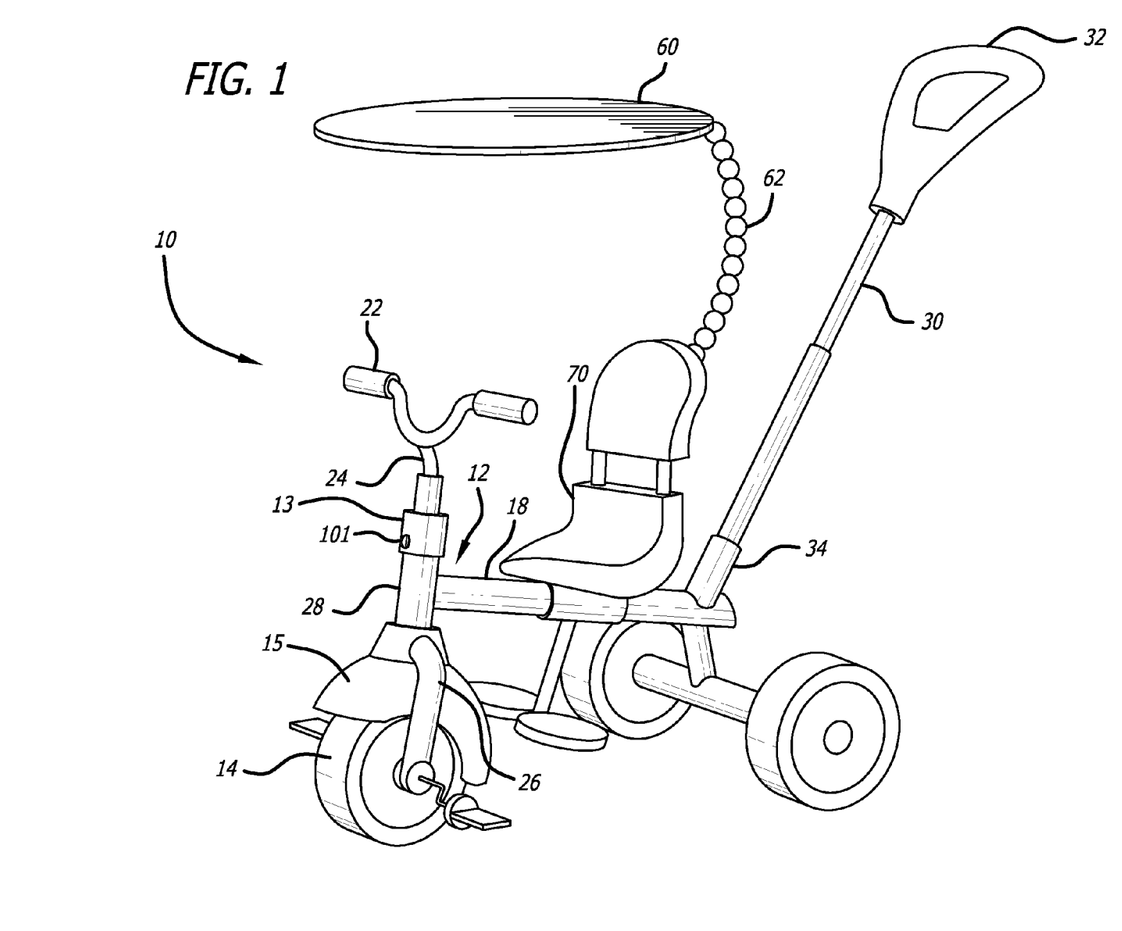
FIG. 1 is a side perspective view of the invention according to a first embodiment of a parent steerable tricycle with internal steering limiter according to the present invention.
Figure 2:
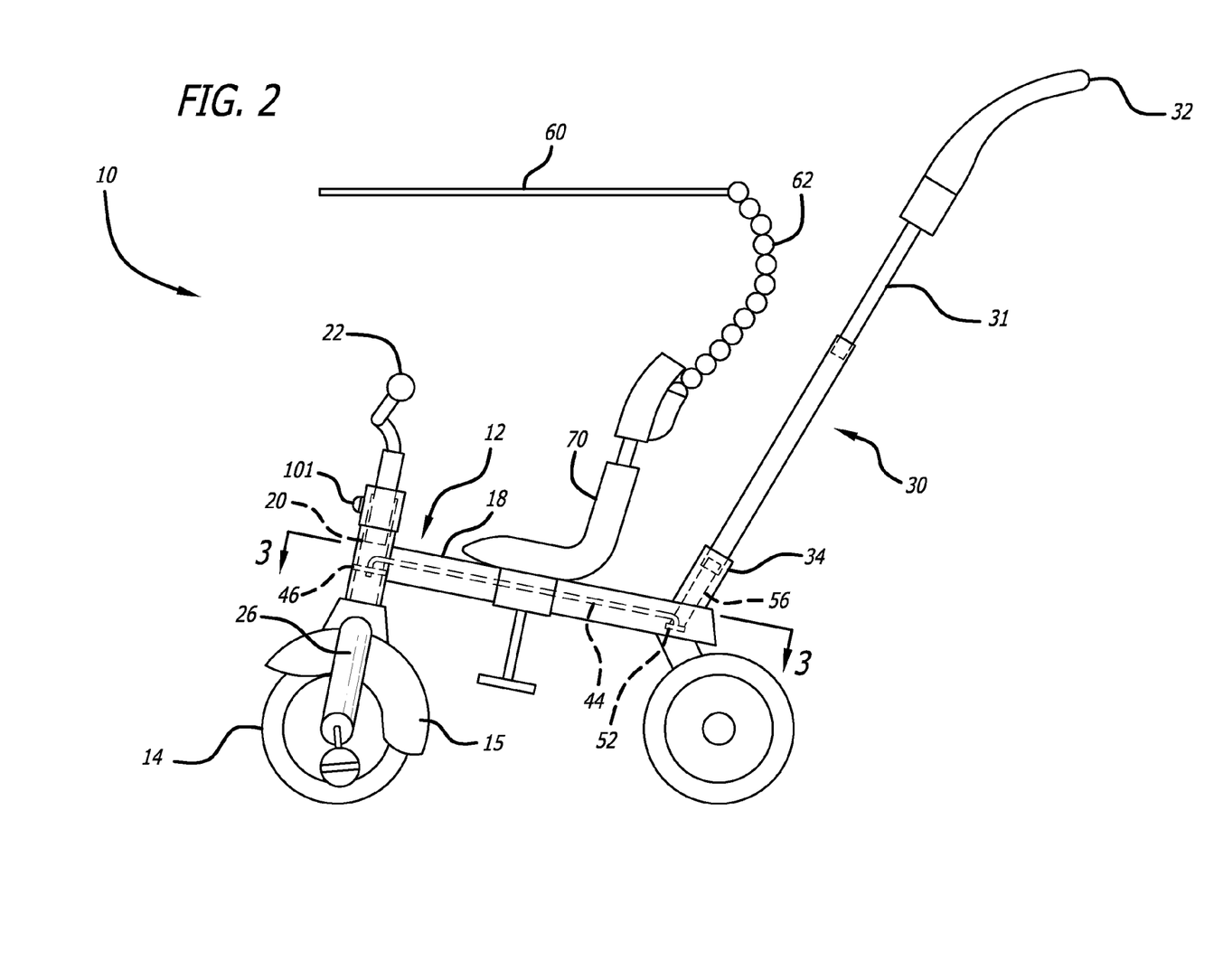
FIG. 2 is side elevation view of the tricycle of FIG. 1.
Figure 5:
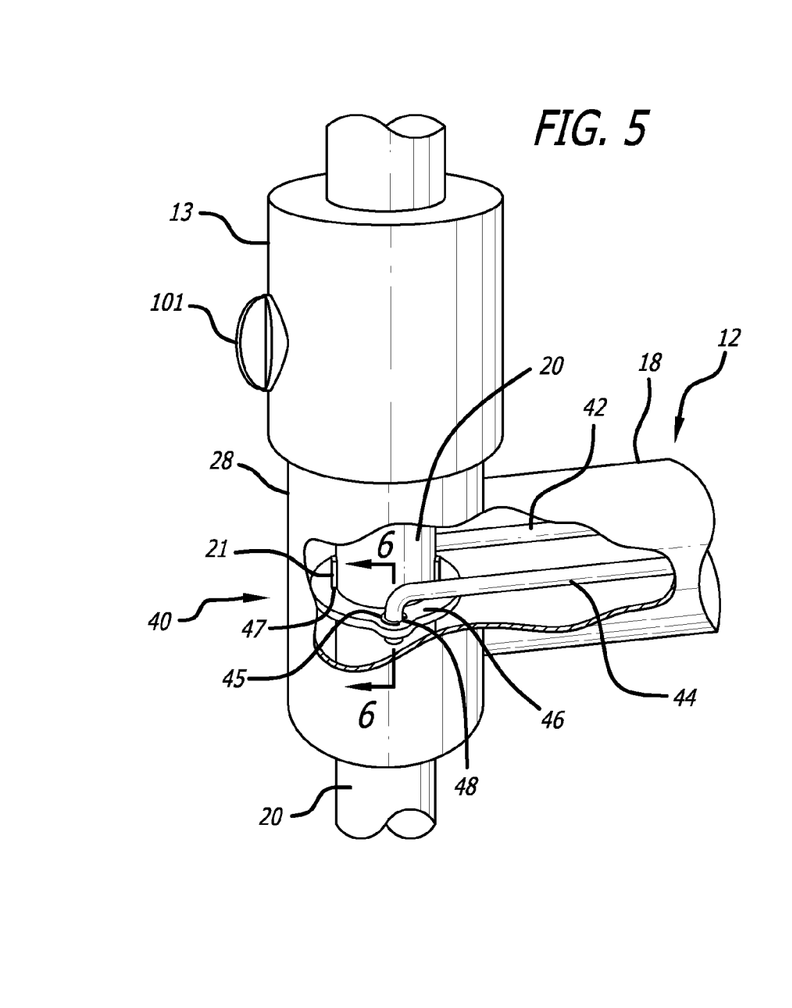
FIG. 5 is a partial cutaway side perspective view of the tricycle of FIG. 1 in the area of frame 12 where frame cross tube 18 meets fork support tube 28, revealing the forward parts of steering coupling mechanism 40.

FIG. 1 is a side perspective view of the invention according to a first illustrative embodiment of a parent steerable tricycle with internal steering limiter according to the present invention. Although the vehicle in the embodiment is a tricycle, it will be understood that the invention can be applied to any child's vehicle. Tricycle 10 has a hollow frame 12 that includes a generally horizontally extending hollow cross tube 18 and a generally vertical hollow fork support tube 28 that are welded or otherwise affixed together. Steerable front wheel 14 and fender 15 are mounted to front wheel fork 26. Front wheel fork 26 includes fork tube 20 which is seen in FIG. 2 and FIG. 5. Fork tube 20 extends into fork support tube 28 and is rotatable within fork support tube 28 to provide steering to the front wheel. Rider platform 70 such as the seat shown is mounted to frame 12. Rider platform 70 need not be mounted directly to frame 12; rather the term "mounted to" contemplates both direct mounting to frame 12, and indirect mounting with some other part or parts disposed between rider platform 70 and frame 12, or even that rider platform 70 is part of the frame itself. Rider platform 70 could be a seat for sitting upon as shown in the embodiment, or could even be a platform for the child to stand upon. Rider platform 70 will henceforth be referred to simply as the seat for simplicity. In the embodiment, sun shade 60 is supported by flexible sun shade support 62, which are not part of the invention. Steering handle 22, which can take the form of handlebars 22 as illustrated, a steering wheel, or other type of steering handle, is affixed to child's steering column 24 at a location suitable for the child to grasp, and allows the child to steer the vehicle. Collar 13 supports an engaging/disengaging knob 101 whose function will be described later.

Child's steering handle 22 and child's steering column 24 define a primary steering mechanism. A parent's steering handle 32 and parent's steering column 30 are supported by parent's steering support tube 34, and form a secondary steering mechanism including secondary steering handle, secondary steering column, and secondary steering support tube, respectively. Parent's handlebar 32 and parent's steering column 30 need not be operated by a parent, or even necessarily by an adult, and could therefore more generally be referred to as an auxiliary or secondary steering system. For ease of discussion, the term "parent's handlebar" and "parent's steering column" will be used herein, and will be understood to be general terms that are not limited by the identity of the operator. Preferably parent's steering column 30 includes telescoping section 31 and is removable from parent's steering support tube 34. Parent's steering column 30 could, as a unitary piece, extend directly into frame 12. However, that is not necessary. In the preferred embodiment, the bottom of the portion of parent's steering column 30 that is visible in the figure mates with a corresponding piece that lies within parent's steering support tube 34, so that rotation of handle 32 causes rotation of the portion of the steering column that lies inside axle 12 such as square bar 56 seen most clearly in FIG. 3 and FIG. 4. Square bar 56 thus forms part of parent's steering column 30, even though overall parent's steering column 30 is defined in the preferred embodiment by two pieces that mate together within support tube 34 so that those two pieces rotate together.

Frame 12, seat 70, and steering handle 22 are all sized appropriately for a child to ride in the seat and steer the tricycle. Parent's steering column 30 is located behind the seat and extends upwardly from frame 12 so that a parent walking behind tricycle 10 can steer tricycle 10 using the parent's steering handle 32. Parent's steering handle 32 is preferably located at a vertical height that is above child's steering handle 22.

Parent's or secondary steering column 30 is connected by a steering linkage to fork tube 20, such that parent steering column 30 and fork tube 20 rotate together.

FIG. 2 is side elevation view of the tricycle of FIG. 1, showing some of the internal components.

Figure 3:
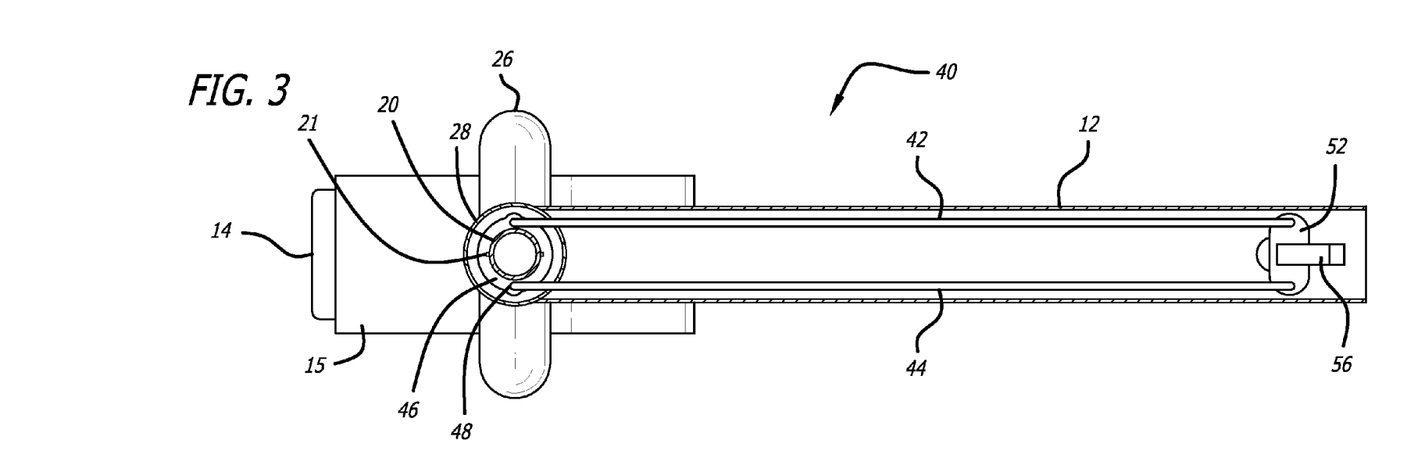
FIG. 3 is a cutaway top plan view of the tricycle of FIG. 1.
Figure 4:
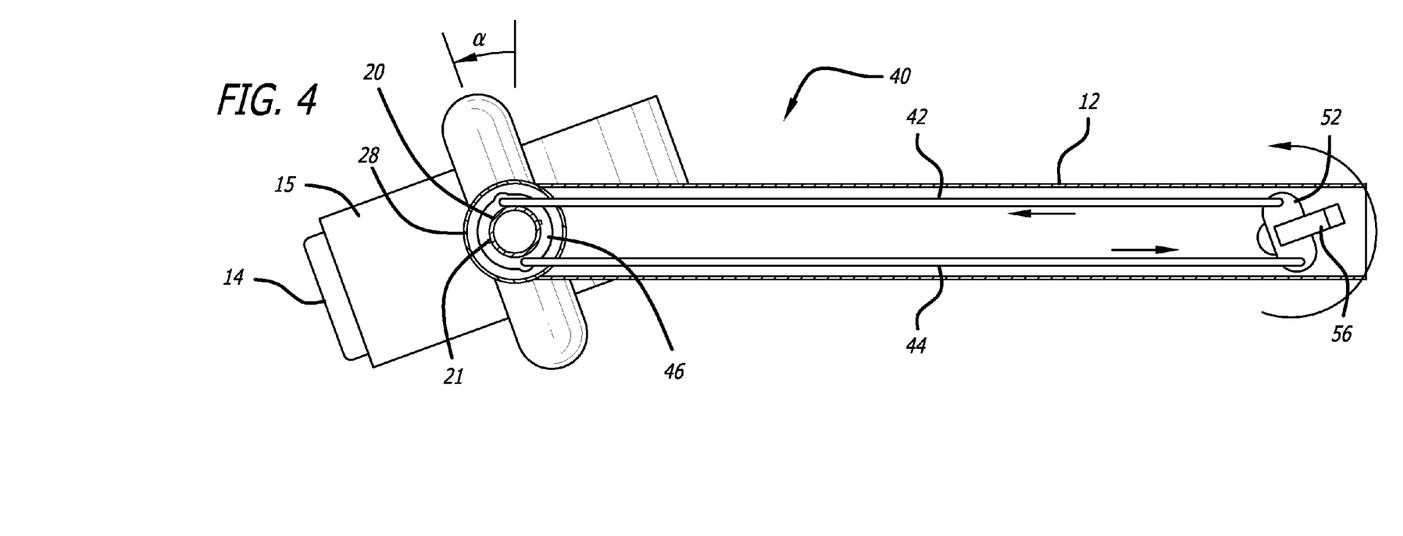
FIG. 4 is a cutaway top plan view of the tricycle of FIG. 1 with the front wheel turned to the left to the maximum steering angle.

FIG. 3 is cutaway top plan view of the tricycle of FIG. 1, and FIG. 4 is the same view as seen in FIG. 3 but with the front wheel turned to the left to the maximum steering angle. The figures show the details and operation of steering linkage 40 according to the first illustrative embodiment. A first flange 46 surrounds and is affixed to, or otherwise extends from, fork tube 20. Splines 21 on fork tube 20 extend through corresponding slots 47 in first flange 46 so that flange 46 and fork tube 20 rotate together. Splines 21 are seen most clearly in FIG. 5. Other suitable means may be used to fix flange 46 to fork tube 20. Square bar 56, which forms part of secondary steering column 30, is affixed to the bottom of frame 12 so that secondary steering column 30 including square bar 56 can rotate. Second flange 52 is attached to square bar 56. In the embodiment, flange 52 has a square aperture in it that mates with square bar 56, such that square bar 56 and flange 52 rotate together. Bar 56 and the corresponding aperture in flange 52 need not be square; they could have different multi-sided shapes including triangular, or hexagonal, for example, Still further, flange 52 and bar 56 could be splined together similar to the way that fork tube 20 and first flange 46 are splined together. Still further, flanges 46 and 52 could be affixed to their respective steering columns via some other suitable means such as welding. A pair of relatively rigid steel steering rods 42 and 44 connect flanges 46 and 52 so that they rotate together, and hence connect fork tube 20 and parent's steering column 30 so that they rotate together. Steering rods 42/44 define steering coupling members.

Figure 6:
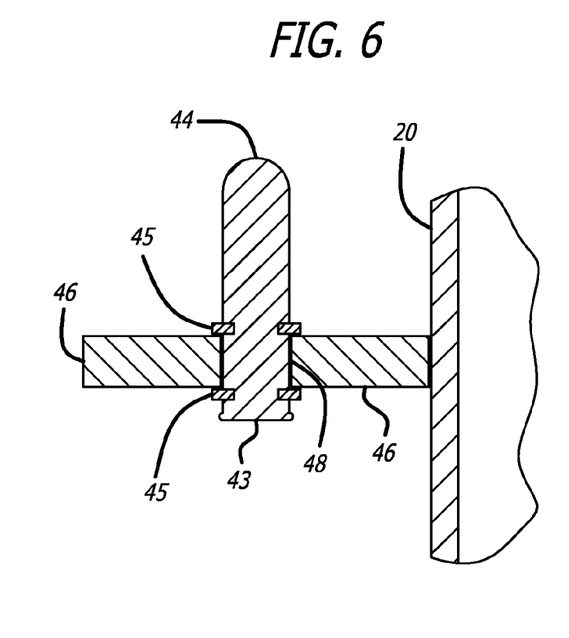
FIG. 6 is cutaway side elevation view of the area around collar 48 and steering connecting rod 44 taken along section line 6-6 in FIG. 5.

FIGS. 5 and 6 show details of steering linkage 40 within fork support tube 28.

FIG. 5 is a partial cutaway side perspective view of the tricycle of FIG. 1 in the area of frame 12 where the generally horizontal frame cross tube 18 meets fork support tube 28. Steering rods 42 and 44 extend on either lateral side of fork tube 20, and are attached to first flange 46 on respective lateral sides thereof.

FIG. 6 is cutaway side elevation view of the area around flange 46 and steering connecting rod 44 taken along section line 6-6 in FIG. 5. Steering rod 44 has a 90° bend at its forward end. That end extends through hole 48 in flange 46, and is secured in hole 48 by two C-clips 45 or by other suitable means. Steering rod 44 optionally has an enlarged head 43 that can be formed by, e.g., forcefully pinching the end of the rod so as to narrow it in one direction and enlargen it in the other direction. If provided, enlarged head 43 helps to ensure that steering rod 44 does not become disengaged from flange 46, and/or eliminates the need for the lower C-clip. The end of steering rod 44 is free to rotate within hole 48 about an axis that is vertical to the page, i.e., the y-axis, as illustrated in FIG. 6. At its rear end, steering rod 44 is similarly affixed to the rear or second flange 52. Steering rod 42 is affixed at its forward and rear ends to first flange 46 and second flange 52 in the same manner.

Returning to FIGS. 3 and 4, FIG. 3 shows the tricycle being steered straight ahead.

FIG. 4 shows the tricycle being turned to the left to the maximum steering angle α. In this position, right side steering coupling rod 42 contacts fork tube 20. Because steering coupling rod 42 is held more or less firmly at its rear end by rear flange 52 which prevents rod 42 from rotating in the z-axis of the figure, the combination of fork tube 20 and rear flange 52 exert a counterforce that tends to push front flange 46 in the direction opposite from the turn, preventing any further rotation of fork tube 20 and hence any further steering rotation of wheel 14 to the left. Similarly, when fork 26 is turned sufficiently far to the right, left side steering coupling rod 44 contacts fork tube 20, and the combination of fork tube 20 and rear flange 52 exert a counterforce that tends to push front flange 46 in the direction opposite from the turn, preventing any further rotation of fork tube 20 and hence any further steering rotation of wheel 14 to the right. Fork tube 20 and rear flange 52 together therefore act as stop members that limit rotation of the steering. In this way, steering coupling rods 42, 44 and rear flange 52 form part of both the steering coupler that transmits steering from parent steering column 30 to fork tube 20, and also form part of steering limiter. The maximum steering angle α should be less than ±60°, and more preferably less than ±45°. In the embodiment, the predetermined maximum steering angle α is about ±20°. This prevents the child from steering the tricycle so hard to one side or the other that the tricycle tips or the front wheel jackknives against the frame or the child's legs. The steering limiter therefore serves a safety function.

As described so far, the invention includes a secondary steering mechanism that may be operated by an adult and is coupled to the primary steering mechanism. The steering coupling mechanism includes a steering limiter that limits steering to a maximum steering angle α of about ±20°, with the steering coupling mechanism and the steering limiter being located entirely within the hollow tubes that define the tricycle frame.

Figure 7:
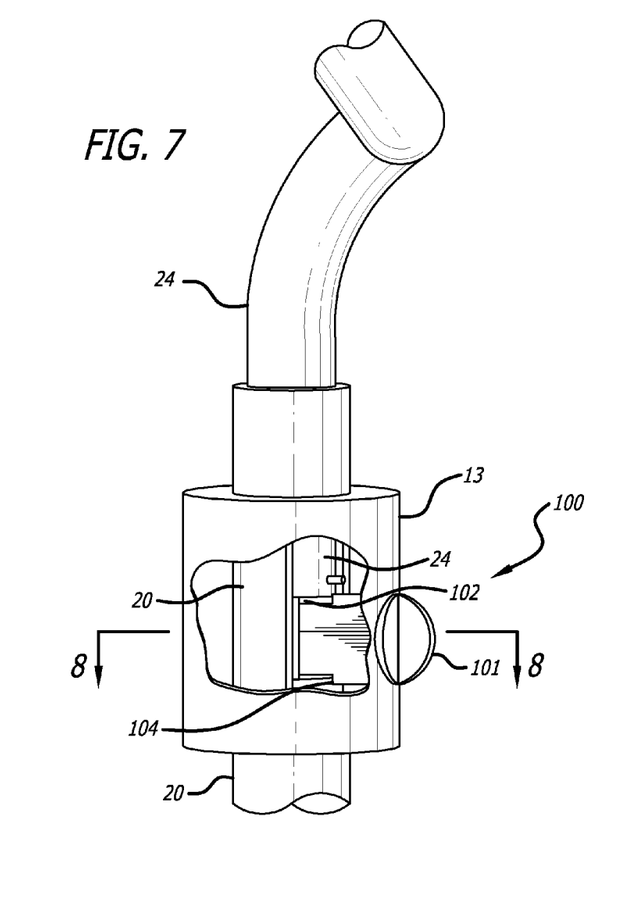
FIG. 7 is a partial cutaway side perspective view of the child's steering engaging/disengaging mechanism 100 of the tricycle of FIG. 1.
Figure 8:
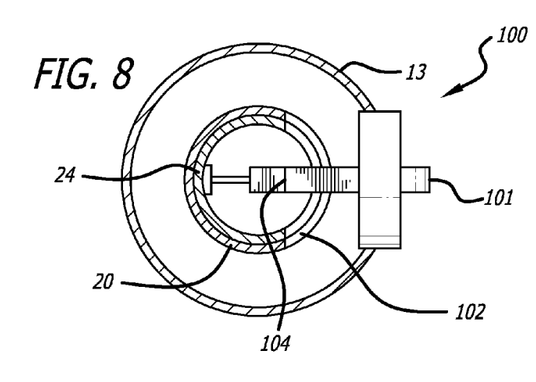
FIG. 8 is a cutaway top elevation view of the child's steering engaging/disengaging mechanism 100 taken along section line 8-8 in FIG. 7 with engaging/disengaging knob 101 in the unlocked (disengaged) position.
Figure 9:
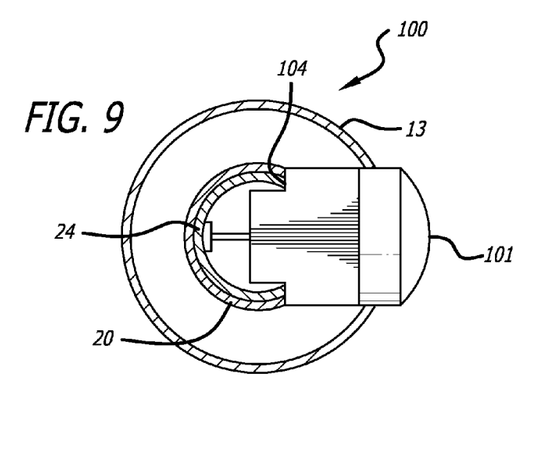
FIG. 9 is a cutaway top elevation view of the child's steering engaging/disengaging mechanism 100 taken along section line 8-8 in FIG. 7 with engaging/disengaging knob 101 in the locked (engaged) position.

Optionally, the tricycle can also have a child's steering engaging/disengaging mechanism that allows the user to disengage the primary steering handle 22 from fork tube 20. FIGS. 7-9 show the child's steering engaging/disengaging mechanism 100 of the tricycle of FIG. 1 according to the illustrative embodiment.

FIG. 7 is a partial cutaway side perspective view of the child's steering engaging/disengaging mechanism 100. FIGS. 8 and 9 are cutaway top elevation views of the engaging/disengaging mechanism 100 taken along section line 8-8 in FIG. 7 with turning knob 101 in the unlocked position and in the locked position, respectively.

Childs's steering column 24 extends into fork tube 20 with enough clearance therebetween such that steering column 24 can rotate within fork tube 20. Engaging/disengaging knob 101 has a key 104 that is rotatably attached to the inside of child's steering column 24. The key extends through aperture 102 in fork tube 20.

When the knob and key are in the disengaged position shown in FIG. 8, there is substantial clearance in the horizontal direction (which is the vertical direction as shown in FIG. 8) between the sides of key 104 and the sides of aperture 102. Child's steering column 24 is thus free to rotate within fork tube 20 for a substantial angle of rotation without transmitting any steering force to fork tube 20 and thus to wheel 14. A child riding on the tricycle can thus play at steering without his turning of the primary steering handle 22 affecting the actual steering of tricycle 10. Rather, it is the parent who is steering the tricycle through parent steering handle 32 and who is completely controlling the steering. The parent therefore does not have to fight the child's efforts to steer, which was a disadvantage in prior parent steerable tricycles.

When the knob and key are in the engaged position shown in FIG. 9, key 104 is now turned so that it substantially fills the horizontal dimension of aperture 102 with no substantial gap between the sides of key 104 and the sides of aperture 102. In this position, there is no substantial play between rotation of the child's steering column 24 and fork tube 20. The child's steering column 24 is thus effectively locked to fork tube 20, and thus child's steering handle 22 is engaged with fork tube 20 and hence to directional steering of wheel 14. Steering handle 22 thus directly controls the steering of the tricycle.

Alternatively, the positions of fork tube 20 and child's steering column 24 could be swapped, with fork tube 20 extending into child's steering column 24, and knob 101 being rotatably attached to the inside of fork tube 20 so as to selectively fill or not fill an aperture in child's steering column 24.

Engaging/disengaging knob 101 therefore allows a parent or other user to quickly switch tricycle 10 between two modes. In the first and engaged mode, the child's handlebar 22 is directly coupled to front wheel 14, and controls the directional pointing of front wheel 14. Additionally, when the parent's steering column 30 is inserted into its position on tricycle 10, the parent's handlebar 32 is also directly coupled to, and also directly controls, the directional pointing of front wheel 14. In this mode the parent can either momentarily assist the child by correcting the child's steering, or the parent can take over the steering by simply exerting more turning force than the child.

In the second and disengaged mode, the child's handlebar 22 is decoupled from front wheel 14 and turns freely. Whatever direction the child turns child's handlebar 22 does not affect front wheel 14. By placing the tricycle in this mode, the parent can steer the tricycle herself without interference from the child. This mode is useful so that an extremely young child can play at steering the tricycle while his parent actually does the steering, or when play time is over and the parent simply wants to get home as quickly as possible. These are examples only of the uses for these two modes of operation.

Figures 10, 11:
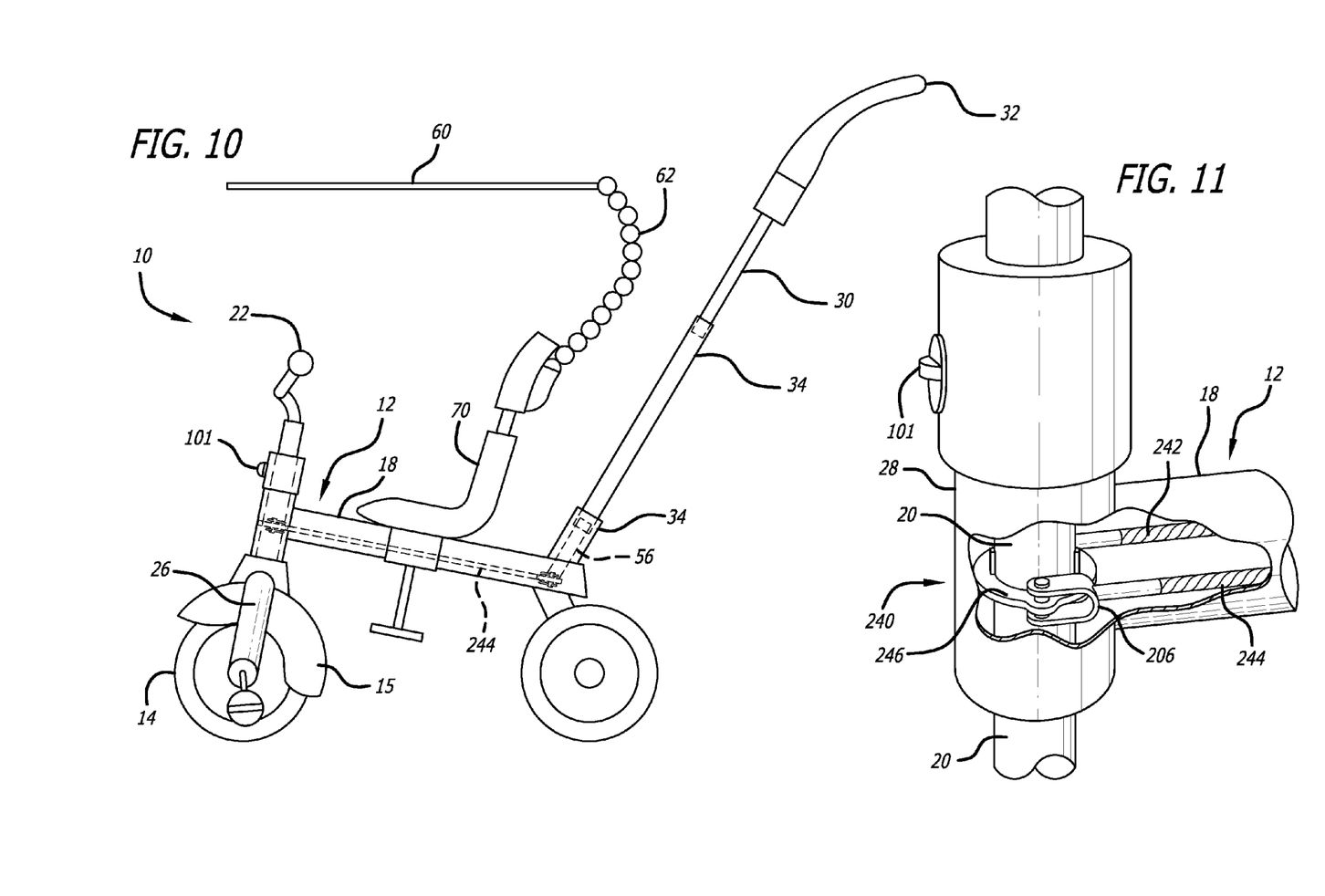
FIG. 10 is a side elevation view of the invention according to a second embodiment.
FIG. 11 is a partial cutaway side perspective view of the tricycle of FIG. 10 in the area where the frame cross tube meets the fork support tube.

FIGS. 10 and 11 illustrate a second embodiment of the invention. FIG. 10 is a side elevation view of the second embodiment, and FIG. 11 is a partial cutaway side perspective view of the tricycle of FIG. 10 in the area where the frame cross tube meets the fork support tube. In this embodiment, steering cables 242 and 244 are attached to the first steering flange through swage fittings 206, and are similarly attached to the rear steering flange through swage fittings. It would be expected that in this embodiment, the steering does not stop as suddenly at a predefined maximum steering angle as in the first embodiment. Rather, there would be some elastic give in the steering, such that at a predefined angle the mechanism would begin to resist further steering but would not stop rigidly. The mechanism thus provides a gentler rider experience, and thus may be preferred by some consumers.

Figure 12:
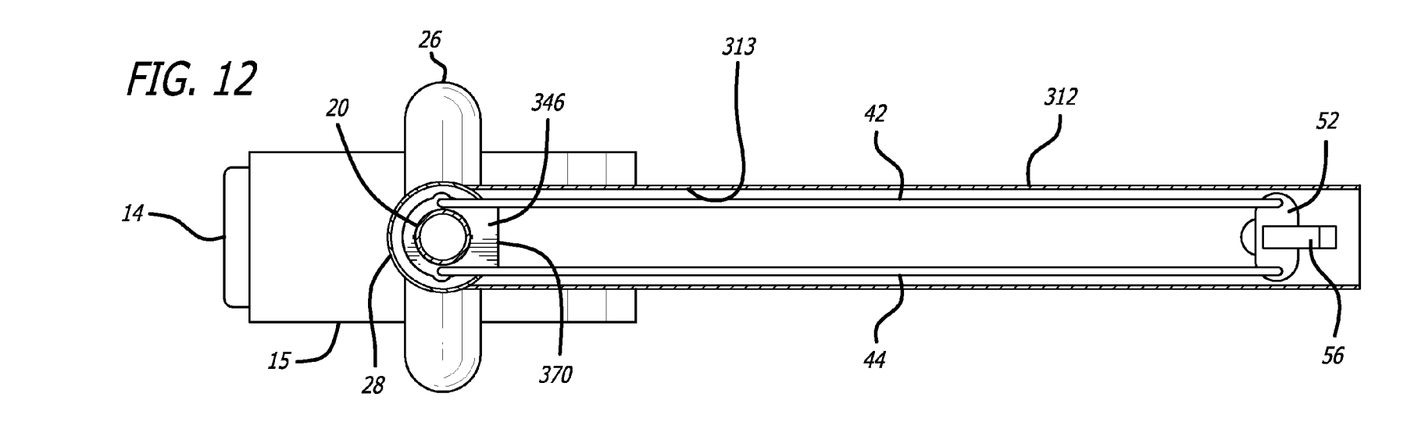
FIG. 12 is a cutaway top elevation view of the invention according to a third embodiment.
Figure 13:
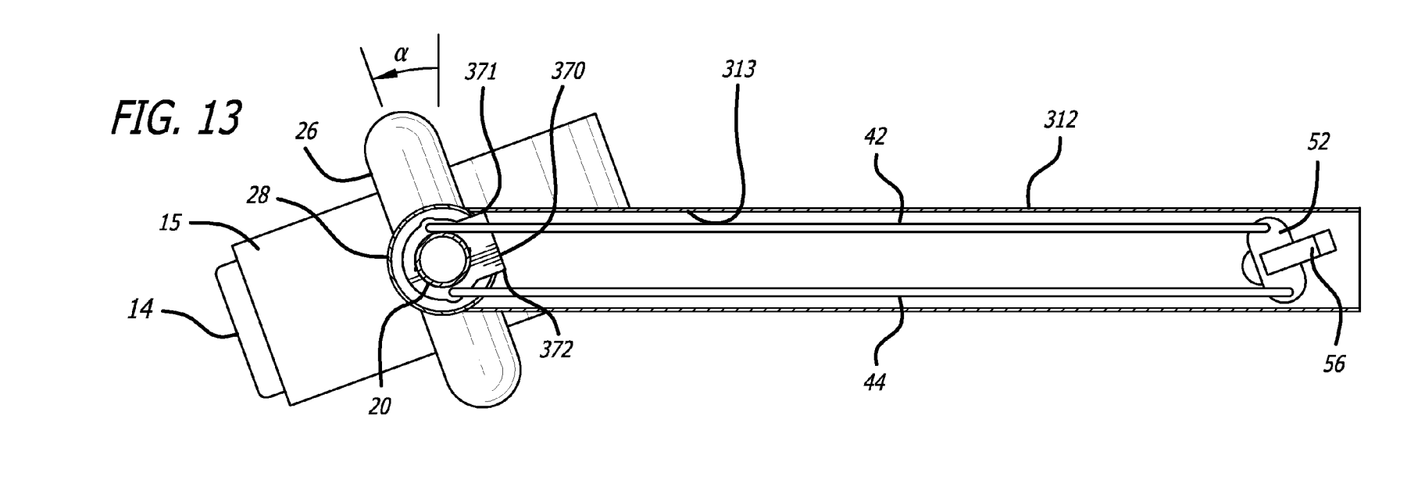
FIG. 13 is a cutaway top elevation view of the tricycle of FIG. 12 with the front wheel turned to the left to the maximum steering angle.

FIG. 12 is a cutaway top elevation view of the invention according to a third embodiment, and FIG. 13 is a cutaway top elevation view of the tricycle of FIG. 12 but with the front wheel turned to the left to the maximum steering angle. This embodiment employs two different steering limiter mechanisms, namely, the same steering limiter mechanism 40 as described with respect to the first embodiment, and an additional steering limiter mechanism that employs an alternative flange 346. Flange 346 has a projecting portion 370 that projects into frame tube 312. Sides 371 and 372 of projecting portion 370 of flange 346 define stop surfaces. When the steering is turned sufficiently far to the left as shown in FIG. 13, stop surface 371 on flange 346 butts up against internal wall 313 of frame tube 312 to prevent further steering rotation. Internal wall 313 thus defines a stop element. Similarly, when the steering is turned sufficiently far to the right, stop surface 372 on flange 346 butts up against internal wall 313 of frame tube 312 to prevent further steering rotation. In the embodiment shown, stop surfaces 371 and 372 contact inner wall 313 at the same predetermined maximum steering angle α as steering rods 42/44 contact fork tube 20. The two steering limiter mechanisms therefore engage at the same time in this embodiment, and work in parallel. The embodiment is otherwise the same as the first embodiment, and FIGS. 1, 2, and 6-9 apply to this embodiment as well.

Alternatively, projecting portion 370 could be formed of a resilient material such as an elastomeric member that is riveted or otherwise affixed to flange 346, and could engage the frame tube wall 313 before the steering rods 42/44 butt up against fork tube 20. This would give the steering limiter an elastic feel similar to the embodiment of FIGS. 10 and 11, with the steering becoming difficult before further steering is impossible.

Still further, the steering limiter mechanism defined by flange 346, whether flange 346 has a resilient portion or not, could be used with some other type of steering coupling system other than the steering rods 42/44 or steering cables 242/244. Flange 346 could therefore function as a safe steering limiter regardless of what kind of steering linkage is used. Flange 346 could also function as a safe steering limiter in a vehicle that has no secondary steering mechanism and thus no steering linkage, and/or has no child's steering engagement/disengagement mechanism, such as in an otherwise traditional tricycle. Because flange 346 resides entirely inside hollow frame 312, a child cannot get his fingers caught in the mechanism.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention.

What is claimed is:

1. A child's vehicle comprising:
a hollow frame comprising a cross tube and a fork support tube affixed thereto;
a wheel mounted to a wheel fork, the wheel fork including a fork tube which extends into the fork support tube;
a rider platform for supporting the rider;
a secondary steering column disposed behind the rider platform and extending into the frame;
a first flange affixed to the fork tube to rotate therewith, the first flange being located within the frame;
a second flange affixed to the secondary steering column to rotate therewith, the second flange being located within the frame;
a first steering coupling member comprising a first rigid rod disposed on a first lateral side of each of the two flanges, the first rigid rod extending from the first flange to the second flange, the first rigid rod being located within the frame, the first rigid rod coupling the flanges together such that as one flange rotates the other flange also rotates;
a second rigid rod disposed on a second lateral side of each of the two flanges opposite the first lateral side;
wherein:
when the fork tube is turned sufficiently far in a first rotational direction, the first rigid rod encounters a first stop member preventing further rotation of the fork tube in that first direction; and
when the fork tube is turned sufficiently far in a second rotational direction, the second rigid rod encounters a second stop member preventing further rotation of the fork tube in that second direction.

2. The child's vehicle of claim 1 wherein the fork tube defines the two stop members.

3. A child's vehicle comprising:
a hollow frame, a rider platform, and a primary steering mechanism, all of which are sized for a child to ride and steer the vehicle;
a wheel mounted to a fork, the fork including a fork tube extending into the frame; and
a steering limiter mechanism that is located entirely within the hollow frame and that limits the wheel to a maximum steering angle of less than ±60°, the steering limiter mechanism comprising:
a first flange attached to the fork tube; and
a rod rotatably attached to the first flange;
wherein when the front wheel is turned to the maximum steering angle, the rod contacts the fork tube and exerts a counter rotational force against the first flange thereby preventing the fork tube from rotating further.

4. The child's vehicle of claim 3 wherein the frame comprises a cross tube and a fork support tube welded together.

5. The child's vehicle of claim 3 wherein the vehicle further comprises:
a first steering handle coupled to the fork tube, and disposed in front of the rider platform and in a location such that a child supported on the rider platform can grasp said first steering handle; and
a second steering handle disposed generally behind the rider platform such that an adult walking with the vehicle can grasp said second steering handle, the second steering handle being rotatably coupled to the fork tube such that the adult can steer the vehicle while walking therewith.

6. The child's vehicle of claim 5 wherein the vehicle further comprises:
a steering disengagement mechanism such that the first steering handle can be selectively disengaged from being coupled to the fork tube, thereby allowing the adult to steer the vehicle from the second steering handle while the first steering handle rotates freely without steering the vehicle.

7. The child's vehicle of claim 6 wherein the steering disengagement mechanism includes a rotatable knob mounted on a column that supports the first steering handle, the rotatable knob selectively engaging and disengaging the first steering handle from steering of the vehicle.

8. The child's vehicle of claim 6 wherein the steering disengagement mechanism comprises:
a first shaft having an aperture therein; and
a second shaft having a rotatable key mounted thereto, the rotatable key extending through the aperture in the first shaft;
wherein when the key is rotated to a first and locked position, the key substantially fills a horizontal dimension of the aperture thereby substantially locking the first shaft to the second shaft; and when the key is rotated to a second and unlocked position there is a substantial gap in the horizontal direction between the key and sides of the aperture thereby substantially unlocking the first shaft from the second shaft.

9. The child's vehicle of claim 3 wherein the vehicle is a tricycle.

10. The child's vehicle of claim 3 wherein the maximum steering angle is less than ±25°.

11. A child's vehicle comprising:
a hollow frame, a rider platform, and a primary steering mechanism, all of which are sized for a child to ride and steer the vehicle;
a wheel mounted to a fork, the fork including a fork tube extending into the frame; and
a steering limiter mechanism that limits the wheel to a maximum steering angle of less than ±60°;
wherein the steering limiter mechanism is located entirely within the hollow frame and comprises:
a first flange attached to the fork tube; and
a rod attached to the first flange at a first end of the rod;
wherein when the front wheel is turned beyond a predetermined angle of rotation, the rod exerts a counter rotational force against the first flange thereby resisting further rotation of the fork tube.

12. A child's vehicle comprising;
a hollow frame, a rider platform, and a primary steering mechanism, all of which are sized for a child to ride and steer the vehicle;
a wheel mounted to a fork, the fork including a fork tube extending into the frame; and
a steering limiter mechanism that limits the wheel to a maximum steering angle of less than ±60°;
wherein the steering limiter mechanism is located entirely within the hollow frame and comprises:
a first flange connected to the fork tube;
a rotatable member located within the frame and a second flange attached thereto; and
a pair of rods rotatably connected to the first and second flanges at first and second ends, respectively, of the rods;
wherein a first one of the rods contacts the fork tube and limits the rotation thereof in a first steering direction at a predetermined maximum plus steering angle, and the other one of the rods contacts the fork tube and limits the rotation thereof in a second steering direction at a predetermined maximum minus steering angle.

13. The child's vehicle of claim 12 wherein the rotatable member is coupled to a secondary steering shaft disposed behind the rider platform and extending upwardly from the frame.

14. The child's vehicle of claim 13 wherein the rotatable member comprises a flange having a multi-sided aperture therethrough, and the secondary steering shaft includes a multi-sided portion extending through the multi-sided aperture in mating relationship therewith.

15. The child's vehicle of claim 14 wherein the multi-sided aperture comprises a square shaped aperture, and the multi-sided portion of the steering shaft comprises a square bar.

16. The child's vehicle of claim 13 wherein a secondary steering handle is affixed to the secondary steering shaft and is located at a height that is suitable for a parent to grasp while walking behind the vehicle, thereby allowing a child to ride on the rider platform and a parent to walk behind the vehicle while steering the vehicle via the secondary steering handle.

17. A child's vehicle comprising:
a hollow frame, a rider platform, and a primary steering mechanism, all of which are sized for a child to ride and steer the vehicle;
a wheel mounted to a fork, the fork including a fork tube extending into the frame; and
a steering limiter mechanism that limits the wheel to a maximum steering angle of less than ±60°;
wherein the steering limiter mechanism is located entirely within the hollow frame and the steering limiter mechanism comprises:
a flange affixed to the fork tube, the flange having a stop surface, the flange being located entirely within the frame; and
a stop member located entirely within the frame, the stop surface of the flange encountering the stop member at the maximum steering angle thereby preventing further steering rotational of the wheel.

18. A child's vehicle comprising:
a front wheel mounted to a wheel fork including a fork tube;
a frame, a rider platform, and a primary steering mechanism for steering the front wheel, all of which are sized for a child to ride and steer the vehicle;
a steering limiter that limits the front wheel to a maximum steering angle;
a secondary steering column disposed behind the rider platform;
a steering coupler that couples the secondary steering column to the fork tube such that rotation of the secondary steering column translates to directional rotation of the fork tube, the steering coupler comprising:
a first flange affixed to the fork tube:
a second flange affixed to the secondary steering column; and
a pair of steering coupling rods, each steering coupling rod being connected between the two flanges such that rotation of one flange causes rotation of the other flange;
wherein the steering coupler is located entirely within the frame.

19. The child's vehicle of claim 18 wherein when the fork tube is rotated to a predetermined maximum rotation angle, one of the steering coupling rods contacts the fork tube and prevents further rotation of the fork tube thereby defining at least a part of said steering limiter.

20. A child's vehicle comprising:
a vehicle frame and a rider platform for supporting a child;
a steerable wheel;
a first steering handle disposed in front of the rider platform such that a child can grasp the first steering handle while supported on the rider platform;
a second steering handle located at a height that is higher than the first steering handle, the second steering handle being rotatably coupled to the steerable wheel such that a second person walking along with the vehicle can steer the vehicle using the second steering handle; and
means for selectively engaging and disengaging the first steering handle from the steerable wheel such that:
when the first steering handle is engaged with the steerable wheel, the child can steer the vehicle; and
when the first steering handle is disengaged from the steerable wheel, the child can move the first steering handle without the steerable wheel being moved thereby, and the second person can steer the vehicle using the second steering handle.

21. The child's vehicle of claim 20 further comprising a fork tube extending into the frame, and wherein:
the vehicle frame is hollow; and
the second steering handle is rotatably coupled to the fork tube by a coupling mechanism that lies entirely within the hollow frame.

22. The child's vehicle of claim 20 wherein the selecting engaging and disengaging mechanism comprises a rotatable key within an aperture that is rotatable to selectively substantially fill said aperture.

23. The child's vehicle of claim 20 wherein the selecting engaging and disengaging mechanism comprises a rotatable member operable by said second person.

* * * * *